March 12, 1963  R. L. ATKINSON  3,080,731
BEARING RACES

Filed Dec. 8, 1960  2 Sheets-Sheet 1

Inventor:
RICHARD LESLIE ATKINSON

By
Richardson, David and Nordon
Attorneys.

March 12, 1963  R. L. ATKINSON  3,080,731
BEARING RACES

Filed Dec. 8, 1960  2 Sheets-Sheet 2

Inventor:
RICHARD LESLIE ATKINSON

By Richardson, David and Nardon
Attorneys.

United States Patent Office 3,080,731
Patented Mar. 12, 1963

3,080,731
BEARING RACES
Richard L. Atkinson, Clitheroe, England, assignor to Atkinson's Agricultural Appliances Limited, Clitheroe, England, a British company
Filed Dec. 8, 1960, Ser. No. 74,532
Claims priority, application Great Britain Dec. 10, 1959
3 Claims. (Cl. 64—4)

This invention relates to annular bearings.

The present invention is for fitment between a rotatable shaft and a guard adapted to encompass said shaft circumferentially in spaced relationship therefrom, an annular bearing comprising an inner component having an inside surface defining a bore and adapted to fit around said shaft, and an outside surface with an annular groove defining an inner race; and two mutually-complementary outer components snap-fitting together and having inside surfaces in mutual continuity together having an annular groove defining an outer race, and outside surfaces in mutual continuity adapted snugly to fit within and be secured internally to said guard; a collar integral with said inner component and having an outside surface and an inside surface, said collar inside surface defining a bore and being adapted to fit around said shaft, said collar being radially contractile; means mounted on said collar outside surface and adapted to contract said collar radially; anti-friction elements disposed between said inner and outer races; annular bearing shoulder means on said outside surface of said inner component to each side of said inner race, and annular shoulder means on said inside surface of each said outer component, each said annular shoulder means seating on one of said annular bearing shoulder means; and each of said components being moulded of plastic material.

Each said annular bearing shoulder means preferably comprises three surfaces mutually at right angles, namely an intermediate surface in a plane radial to the axis of said inner component and two surfaces circumferential to said axis and at different radii therefrom and extending in opposed directions from said intermediate surface, and each said annular shoulder means has seating surfaces complementary to said three surfaces whereby the bearing is adapted to take both radial loads through the circumferential surfaces and thrust loads in either direction through the radial surfaces and said anti-friction elements. The anti-friction components are preferably also moulded of plastic material.

The collar is preferably formed with a plurality of spaced slits parallel to its longitudinal axis, such slits penetrating the free edge of the collar, and a contractile clip such as a worm clip is provided to secure the collar in position about a shaft.

The present invention is also a machinery guard comprising a tubular sheath adapted floatingly to encompass a shaft coupling comprising a telescopic shaft provided at each of its ends with a universal joint for connection to driving and driven machinery, frustoconoidal end pieces on the ends of said sheath and mounted co-axially with the latter and with the larger diameter ends directed outwardly, and an annular bearing as hereinbefore defined mounted within each of said end pieces with the outer races clamped thereto.

An embodiment of the invention will now be described, by way of example, with reference to the accompanying drawings, in which.

Figure 2:
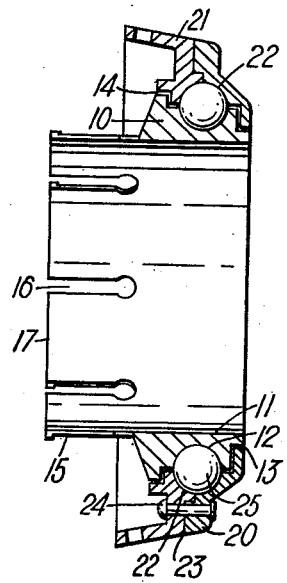
FIG. 2 is an axial section through a bearing according to the invention.
Figure 3:
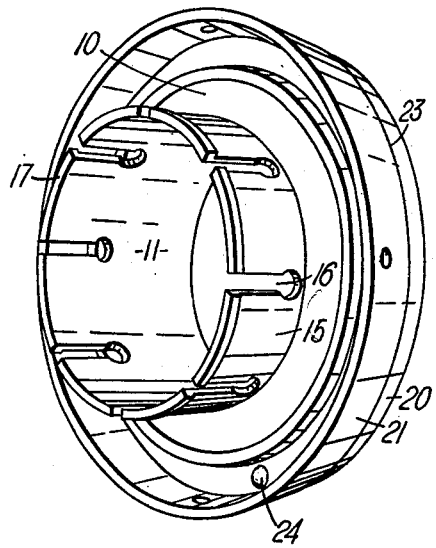
FIG. 3 is a perspective view of the bearing.
Figure 4:
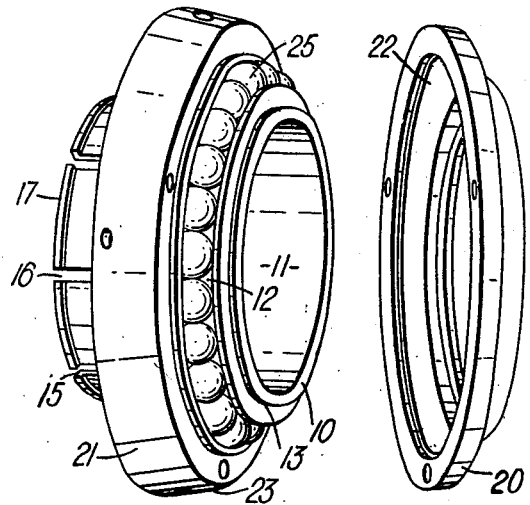
FIG. 4 is a partially exploded view of the bearing showing the ball bearings and the races.

Referring now to the drawings and especially to FIGS. 2 to 4 thereof, an annular bearing comprises three components moulded from nylon. One component 10 has a cylindrical internal surface 11 defining a bore and adapted to fit around a shaft, and is formed externally over substantially half its length with an annular groove 12 providing the inner race of the bearing. To one side of the groove 12 there is an annular shoulder 13 of lesser diameter than the maximum groove diameter and to the other side of the groove 12 there is an annular shoulder 14 of greater diameter than the maximum groove diameter, so that the groove 12 is flanked on the one side by a step-down shoulder 13 and on the other side by a step-up shoulder 14, both shoulders facing in the same direction and away from the split tube portion or collar of the component 10 to be hereinafter referred to.

The remaining part 15 of the length of the component 10, i.e. that part not forming the inner race and bearing shoulders, extends from the step-up shoulder 14 as a collar integral with the component 10 and having a bore co-axial with an in mutual continuity with the bore defined by the surface 11. The collar 15 is provided with a plurality of circumferentially spaced longitudinal slits 16 extending parallel to the axis of the component from adjacent the step-up shoulder 14 to and through the free edge 17 of the collar 15, thus to enable radial contraction of the collar. Associated with the collar 15 is a worm-drive clip 18, or other circumferentially contractile clip, for mounting about the split tube portion or collar 15 of the component 10 to clamp same to a shaft 19. It should be noted that the shaft 19 need not have a specially machined surface for the fitting of the component 10 which incorporates the inner race 12 of the bearing, and thus the bearing can readily be fitted to the shafts of existing machinery.

The other two components 20 and 21 of the bearing are also annular and together make up the outer race 22 of the bearing. The outer race 22 is a split race, the two components 20 and 21 coming together with a snap fit along a line 23 substantially bisecting the outer race 22 circumferentially and are secured together by means of rivets 24. Each component making up the outer race 22 is formed with an annular shoulder which fits over one of the annular bearing shoulders of the inner race component 10. The race is completed by a row of nylon balls 25. A hole 31, drilled in the component 20, permits the balls 25 to be lubricated without splitting the race 22.

In assembling the race that component 21 thereof adapted to engage the larger bearing shoulder 14 of the inner race component 10 is fitted about the latter, being slid into position from the end of the inner race component remote from the split tube portion 15. The balls 25 are then placed in position in the seating thereby provided by the inner race and half of the outer race and the other outer race component 20 slid into position from the same end of the inner race component 10 and snap fitted into position. The components 20 and 21 making up the outer race are positively secured together after assembly by means of the rivets 24.

Figure 1:
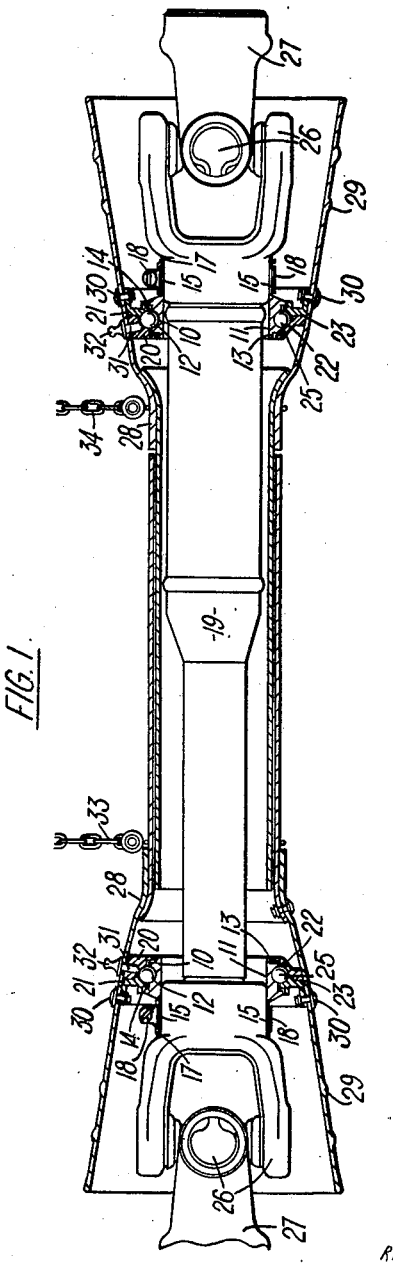
FIG. 1 is a sectional side elevation of a machinery guard, according to the invention, mounted on a telescopic shaft.

In FIG. 1 the bearing is shown used in conjunction with a telescopic machinery guard 28 and mounted on a telescopic shaft 19. The shaft 19 is provided adjacent each of its ends with a universal joint 26 from which extends a stub shaft 27, one such stub shaft being adapted to mate with a power take off spigot, for example on a tractor, and be fixedly secured therein, and the other stub shaft to mate with a spigot in an implement mechanism, for example on a trailer, and be fixedly secured therein. A frusto-conoidal end piece 29 at each end of the machinery guard 28 is secured to the component 21 of the bearing by means of rivets 30. A grease nipple 32 is mounted on each end piece to co-operate with the hole 31 and permit lubrication of the bearing. To mount the assembly on the shaft, the male and female sections of the shaft are first separated. One section of the safety guard 28 is then mounted on each section of the shaft 19 by sliding the end piece and the bearing mounted thereon along the shaft 19 until the bearing is adjacent the universal joint 26, the cylinder internal surface 11 of each inner component fitting around the shaft. The worm-drive clip is then tightened to secure the bearing on the shaft 19. The shaft 19 may then be reassembled, the two sections of the shaft 19 engaging each other at the same time. The assembled guard 28 and shaft 19 is then as shown in FIG. 1, the two securing chains 33 and 34 being secured to the implement and to the tractor respectively.

I claim:

1. For use with a telescopic shaft provided at each of its ends with a universal joint from which extend stub shafts for connection, respectively, to driving and driven machinery, a guard comprising two telescopically-related tubular sheaths and frusto-conoidal end pieces on the mutually-remote ends of said sheaths, said end pieces being mounted co-axially with said sheaths and with their larger diameter ends directed away from said sheaths; an annular bearing mounted within each said end piece, each said bearing comprising an inner component having an inside surface defining a bore and adapted to fit around said shaft adjacent one said universal joint, and an outside surface with an annular groove defining an inner race; and two mutually-complementary outer components snap-fitting together and having inside surfaces in mutual continuity together having an annular groove defining an outer race, said outside surfaces in mutual continuity together defining a frusto-conoidal shape and fitting snugly within one said end piece; means securing at least one of said outer components internally to said end piece; a collar integral with said inner component and having an outside surface and an inside surface, said collar inside surface defining a bore and being adapted to fit around said shaft, said collar being radially contractile; means mounted on said collar outside surface and adapted to contract said collar radially; a circumferential row of balls disposed between said inner and outer races; annular bearing shoulder means on said outside surface of said inner component on each side of said inner race and annular shoulder means on said inside surface of each said outer components, each said annular shoulder means seating on said one of said annular bearing shoulder means; and each of said components being moulded of plastic material.

2. For use with a telescopic shaft provided at each of its ends with a universal joint from which extend stub shafts for connection, respectively, to driving and driven machinery, a guard comprising two telescopically-related tubular sheaths and frusto-conoidal end pieces on the mutually-remote ends of said sheaths, said end pieces being mounted co-axially with said sheaths and with their larger diameter ends directed away from said sheaths; an annular bearing mounted within each said end piece, each said bearing comprising an inner component having an inside surface defining a bore and adapted to fit around said shaft adjacent one said universal joint, and an outside surface with an annular groove defining an inner race; and two mutually-complementary outer components snap-fitting together and having inside surfaces in mutual continuity together having an annular groove defining an outer race, said outside surfaces in mutual continuity together defining a frusto-conoidal shape and fitting snugly within one said end piece; means securing at least one of said outer components internally to said end piece; a collar integral with said inner component and projecting axially in one direction therefrom, said collar having an outside surface and an inside surface, said collar inside surface defining a bore and being adapted to fit around said shaft, said collar having a plurality of circumferentially-spaced longitudinal slits extending from adjacent the zone of integration of said collar with said inner component to and through the free edge of said collar; a circumferentially-contractile clip mounted about said collar outside surface and adapted to contract said collar radially; a circumferential row of balls disposed between said inner and outer races; annular bearing shoulder means on said outside surface of said inner component on each side of said inner race and annular shoulder means on said inside surface of each said outer components, each said annular shoulder means seating on said one of said annular bearing shoulder means; and each of said components being moulded of plastic material.

3. For use with a telescopic shaft provided at each of its ends with a universal joint from which extend stub shafts for connection, respectively, to driving and driven machinery, a guard comprising two telescopically-related tubular sheaths and frustro-conoidal end pieces on the mutually-remote ends of said sheaths, said end pieces being mounted co-axially with said sheaths and with their larger diameter ends directed away from said sheaths; an annular bearing mounted within each said end piece, each said bearing comprising an inner component having an inside surface defining a bore and adapted to fit around said shaft adjacent one said universal joint; and an outside surface with an annular groove defining an inner race; and two mutually-complementary outer components snap-fitting together and having inside surfaces in mutual continuity together having an annular groove defining an outer race, said outside surfaces in mutual continuity together defining a frustro-conoidal shape and fitting snugly within one said end piece; first rivet means securing said outer components together; second rivet means securing the larger circumference outer component internally to said end piece; the lesser circumference outer component having therein a first hole penetrating from its outside surface to said outer race; said one end piece having therein a second hole aligned with said first hole; a grease nipple mounted on said one end piece and engaging in said second hole; a collar integral with said inner component and projecting axially in one direct therefrom, said collar having an outside surface and an inside surface, said collar inside surface defining a bore and being adapted to fit around said shaft, said collar having a plurality of circumferentially-spaced longitudinal slits extending from adjacent the zone of integration of said collar with said inner component to and through the free edge of said collar; a circumferentially-contractile clip mounted about said collar outside surface and adapted to contract said collar radially; a circumferential row of plastic balls disposed between said inner and outer races; annular bearing shoulder means on said outside surface of said inner component on each side of said inner race and annular shoulder means on said inside surface of each said outer components, each said annular shoulder means seating on said one of said annular bearing shoulder means; and each of said components being moulded of plastic material.

References Cited in the file of this patent

UNITED STATES PATENTS

| | | |
|---|---|---|
| 2,352,911 | Osplack | July 4, 1944 |
| 2,609,256 | Baker | Sept. 2, 1952 |
| 2,779,643 | Firth | Jan. 29, 1957 |
| 2,785,549 | Harrington | Mar. 19, 1957 |
| 2,928,701 | Ferdig | Mar. 15, 1960 |
| 2,952,142 | Schroter et al. | Sept. 13, 1960 |
| 2,970,018 | Ruttgers | Jan. 31, 1961 |

FOREIGN PATENTS

| | | |
|---|---|---|
| 565,564 | Canada | Nov. 4, 1958 |